US005483631A

United States Patent [19]

Nagai et al.

[11] Patent Number: 5,483,631
[45] Date of Patent: Jan. 9, 1996

[54] COMMUNICATION NETWORK MANAGEMENT SYSTEM FOR DISPLAYING OPERATION STATES OF NETWORK ELEMENTS ON A REMOTE DISPLAY UNIT

[75] Inventors: Yasuhiko Nagai, Tokyo; Ryoichi Sasaki, Fujisawa; Sadao Niinobe, Kawasaki; Michio Suzuki, Yokohama; Keizou Mizuguchi, Kanagawa; Goro Ikeba, Yokohama, all of Japan

[73] Assignees: Hitachi, Ltd., Tokyo; Hitachi Information & Control Systems, Inc., Ibaraki, both of Japan

[21] Appl. No.: 227,681

[22] Filed: Apr. 14, 1994

Related U.S. Application Data

[63] Continuation of Ser. No. 691,566, Apr. 25, 1991, abandoned.

[30] Foreign Application Priority Data

May 1, 1990 [JP] Japan .................................. 2-111687

[51] Int. Cl.⁶ .................................................. G06F 3/00
[52] U.S. Cl. ...................................... 395/155; 395/200.02
[58] Field of Search .................................. 395/155–161, 395/200, 117, 601, 275, 117–120; 340/825.06, 825.02; 379/16, 221, 137; 376/179

[56] References Cited

U.S. PATENT DOCUMENTS

| | | | |
|---|---|---|---|
| 4,456,788 | 6/1984 | Kline et al. | 379/137 |
| 4,601,003 | 7/1986 | Yonyama et al. | 395/159 |
| 4,644,468 | 2/1987 | Doster et al. | 395/200 |
| 4,710,763 | 12/1987 | Franke et al. | 395/160 X |
| 4,734,707 | 3/1988 | Sasaki | 395/117 |
| 4,825,206 | 4/1989 | Brice et al. | 340/825.02 |

(List continued on next page.)

OTHER PUBLICATIONS

Jones, "Introduction to the X Window System", Prentice Hall, 1989, pp. 27–64.
Young, "X Window Systems", Prentice Hall, 1989, pp. 1–42.
Scheifler et al., "The X Window System", ACM, Apr. 1986, pp. 79–109.
Treadway, "Working with Windows", Comp. Graphics World, Sep. 1988, pp. 79–86.
Millikin, "Protion", Patricia Seybold's Network Monitor, Aug. 1989, pp. 1–11.
"Lan Ranger", Lan Mag., Apr. 1989, pp. 23–24, 26, 42, 162.
Musich, "Halley's brouter offer the best of bridges, routers", P. C. Week, Apr. 5, 1988, pp. 13–15.
Rizzo, "Monitoring your network", Mac User, Aug. 1989, pp. 201–204.
Smalbey, "Micom to unlash flock of WAN products", Digital Review, Feb. 6, 1989, p. 16.
Gianatasio, "LAN package keeps tabs on Apple Talk nets", Digital Review, Feb. 6, 1989, p. 14.
J. M. Meunier, "An Interactive Network Display System for Network Management", Network Operations and Management Symposium, IEEE, 1988, pp. 1–18. (Provided in English).

*Primary Examiner*—Mark R. Powell
*Assistant Examiner*—John E. Breene
*Attorney, Agent, or Firm*—Fay, Sharpe, Beall, Fagan, Minnich & McKee

[57] ABSTRACT

A network management/display processing system having a network manager and a display unit, which selects data necessary for display from management data collected from a comunication network to be managed, and converts the selected data into a display data including a display identifier which is provided by the network manager. The display unit receives the display data from the network manager and displays on its screen, a management object corresponding to the display identifier contained in the display data. An attribute value for displaying a state of the management object on the screen in a distinct color manner may be attached to the display data and transmitted from the network manager to the display unit.

10 Claims, 18 Drawing Sheets

| | | | | | | |
|---|---|---|---|---|---|---|
| 4,833,592 | 5/1989 | Yamanaka | 340/706 X | 5,034,945 | 7/1991 | Kimoto et al. | 370/13.1 |
| 4,876,681 | 10/1989 | Hagiwara et al. | 370/60 | 5,049,873 | 9/1991 | Robins et al. | 340/825.06 |
| 4,899,136 | 2/1990 | Beard et al. | 340/706 | 5,050,104 | 9/1991 | Heyen et al. | 395/159 |
| 4,902,469 | 2/1990 | Watson et al. | 376/259 | 5,051,992 | 9/1991 | Taniguchi et al. | 370/110.1 |
| 4,920,529 | 4/1990 | Sasaki et al. | 370/16 | 5,072,412 | 12/1991 | Henderson, Jr. et al. | 395/159 |
| 4,974,173 | 11/1990 | Stefik et al. | 395/159 X | 5,226,120 | 7/1993 | Brown | 395/200 |
| 5,021,976 | 6/1991 | Wexelldat et al. | 395/159 | 5,261,044 | 11/1993 | Dev et al. | 395/159 |
| 5,025,395 | 6/1991 | Nox et al. | 395/159 | 5,295,244 | 3/1994 | Dev et al. | 395/161 |
| 5,031,211 | 7/1991 | Nagai et al. | 379/221 | | | | |

FIG. 3

STATUS DISPLAY COLOR MATRIX TABLE

| STATE (STATE VALUE) | | SEVERITY | | | | | |
|---|---|---|---|---|---|---|---|
| ADMINISTRATIVE STATE | OPERATIONAL STATE | CRITICAL (5) | MAJOR (4) | MINOR (3) | INDETERMINATE (2) | WARNING (1) | NORMAL (0) |
| UNLOCK (01) | DISABLE (00) | RED (BLINK) | RED (BLINK) | RED | ORANGE | YELLOW | DEEP BLUE |
| | ENABLE (01) | RED (BLINK) | RED (BLINK) | RED | ORANGE | YELLOW | BLUE |
| | ACTIVE (10) | RED (BLINK) | RED (BLINK) | RED | ORANGE | YELLOW | GREEN |
| | BUSY (11) | RED (BLINK) | RED (BLINK) | RED | ORANGE | YELLOW | GREEN |
| LOCK (10) | DISABLE (00) | RED (BLINK) | RED (BLINK) | RED | ORANGE | YELLOW | BLACK |
| | ENABLE (01) | RED (BLINK) | RED (BLINK) | RED | ORANGE | YELLOW | GRAY |
| SHUTTING DOWN (11) | ACTIVE (10) | RED (BLINK) | RED (BLINK) | RED | ORANGE | YELLOW | GREEN |
| | BUSY (11) | RED (BLINK) | RED (BLINK) | RED | ORANGE | YELLOW | GREEN |

FIG. 4

DISPLAY IDENTIFIER / DISPLAY COORDINATE CORRESPONDENCE TABLE

| DISPLAY IDENTIFIER | SCREEN DISPLAY COORDINATES (X,Y) |
|---|---|
| 01 | $(X_1, Y_1)$ |
| 02 | $(X_2, Y_2)$ |
| ... | ... |
| nn | $(X_n, Y_n)$ |

FIG. 5

INSTANCE / DISPLAY IDENTIFIER CORRESPONDENCE LIST

| INSTANCE | DISPLAY IDENTIFIER |
|---|---|
| PACKET NETWORK, PACKET EXCHANGE NO. 01 | 01 |
| PACKET NETWORK, PACKET EXCHANGE NO. 02 | 02 |
| ... | ... |
| PBX NETWORK, PBX NO. 128 | nn |

NETWORK CONFIGURATION DISPLAY DATA TABLE

| INSTANCE | ATTRIBUTE DATA | OPERATION DATA | ..., | DISPLAY IDENTIFIER |
|---|---|---|---|---|
| PACKET NETWORK, PACKET EXCHANGE NO. 01 | XXXX | XXXX | ..., | 01 |
| PACKET NETWORK, PACKET EXCHANGE NO. 02 | XXXX | XXXX | ..., | 02 |
| . . . , | . . . , | . . . , | . . . , | |
| PBX NETWORK, PBX NO. 128 | XXXX | XXXX | ..., | nn |

COMMUNICATION NETWORK CONFIGURATION DISPLAY SCREEN

FIG. 11

NETWORK CONFIGURATION DISPLAY DATA TABLE (2)

| NO. | INSTANCE | ATTRIBUTE DATA | OPERATION DATA | ... | DISPLAY IDENTIFIER | CONTAINMENT POINTER |
|---|---|---|---|---|---|---|
| 1 | PACKET NETWORK, PACKET EXCHANGE NO. 01 | xxxx | xxxx | ... | 01 | 16 |
| 2 | PACKET NETWORK, PACKET EXCHANGE NO. 02 | xxxx | xxxx | ... | 02 | 16 |
| ... | ... | ... | ... | ... | ... | ... |
| 7 | HIGH-SPEED DIGITAL NETWORK, MULTIPLEXER NO. 07 | xxxx | xxxx | ... | 07 | 17 |
| ... | ... | ... | ... | ... | ... | ... |
| 28 | HIGH-SPEED DIGITAL NETWORK, MULTIPLEXER NO. 07, COMMUNICATION MODULE | xxxx | xxxx | ... | — | 7 |
| ... | ... | ... | ... | ... | ... | ... |
| n | PBX NETWORK, PBX NO. 128 | xxxx | xxxx | ... | nn | 20 |

COMMUNICATION NETWORK CONFIGURATION DISPLAY SCREEN

DISTRIBUTION DESTINATION TABLE

| DATA SORT (IDENTIFIER) \ NOTIFICATION DESTINATION (IDENTIFIER) | DISPLAY UNIT A(1) | DISPLAY UNIT B(2) | DISPLAY UNIT C(3) |
|---|---|---|---|
| STATUS DATA (1) | ○ | ○ | |
| TROUBLE DATA (2) | ○ | ○ | ○ |
| PERFORMANCE DATA (3) | | | ○ |

COMMUNICATION NETWORK MANAGEMENT SYSTEM FOR DISPLAYING OPERATION STATES OF NETWORK ELEMENTS ON A REMOTE DISPLAY UNIT

This is a continuation of application Ser. No. 07/691,566, filed Apr. 25, 1991, now abandoned.

BACKGROUND OF THE INVENTION

The present invention generally relates to a network management/display processing system and method and, more particularly, to a system and method for displaying on a display unit a state of a communication network including exchanges and data multiplexers using data of a network manager collected from the communication network.

To more efficiently operate and maintain a communication network, the invention provides a communication network managing system which manages the communication network based on operational data collected from the network. IEEE, 1988, Network Operations and Management Symposium, 17-1, discloses a technique in which the above operational data is used to display the operating state on the screen of a display unit in the form of a simulated communication network. However, a detailed description of the data processing of the display unit is not given.

Disclosed in JP-A-64-81990 is an example of an ordinary display processing technique, when a display unit has an insufficient ability, for realizing on the display unit such conversion and processing of display data as display attribute conversion and control.

Problems occur with the aforementioned communication network management system where the display unit is located away from the network manager, where a plurality of display units have different application purposes or where the communication network contains many objects to be managed. When the network manager transmits management data to the display unit or units to convert the management data into the display data on the display unit or units, the display unit must have a very large memory capacity, which results in an increased processing load and an enlarged communication quantity between the network manager and display unit(s). In particular, in a communication network management system based on OSI specifications, ISO/IEC DIS 10165-1 and 10165-2 of the International Organization for Standardization (ISO), the representation format of a standard object to be managed has a very long data length. Thus, communication between the network manager and display unit using this standard format without any modification results in an enormous communication quantity therebetween and a reduced data processing efficiency of the display unit.

SUMMARY OF THE INVENTION

An object of the present invention is to provide a method and a network management/display processing system which includes a network manager and a display unit which reduces the memory capacity of the display unit, the display processing load and the communication quantity between the network manager and display unit.

Another object of the present invention is to provide a method and a network management/display processing system in which a user of a display unit can freely set the display format of the display unit according to his or her preference.

To attain the above objects, a network manager is provided which can select, convert and process data necessary for display while a display unit previously sets display data sorts and presentation methods to be handled. In more detail, the display unit has a means for generating a display identifier corresponding to a management object in a network arrangement to be displayed on the screen of the display unit. Meanwhile, the network manager has a means for registering a data table showing correspondences between management data (component data) collected from the communication network and the aforementioned display identifier. The network manager selects, converts and processes the above component data into display data which in turn is sent to the display unit in the form of a minimal signal necessary for the display unit. The aforementioned display identifier is used for communication between the communication network and the display unit.

In accordance with a preferable aspect of the present invention, the display unit has a display presentation format setter for setting the presentation format of the display screen selected by a user.

BRIEF DESCRIPTION OF THE DRAWINGS

FIG. 3 is a status display color matrix table used in the embodiment;

FIG. 4 is a table showing correspondences between display identifiers and display coordinates for use in the embodiment;

FIG. 5 is a list showing correspondences between display identifiers and instances for use in the embodiment;

FIG. 11 is a network configuration/display data table including containment pointers;

DESCRIPTION OF THE PREFERRED EMBODIMENTS

Embodiments of the present invention will be explained with reference to the attached drawings.

Figure 1:
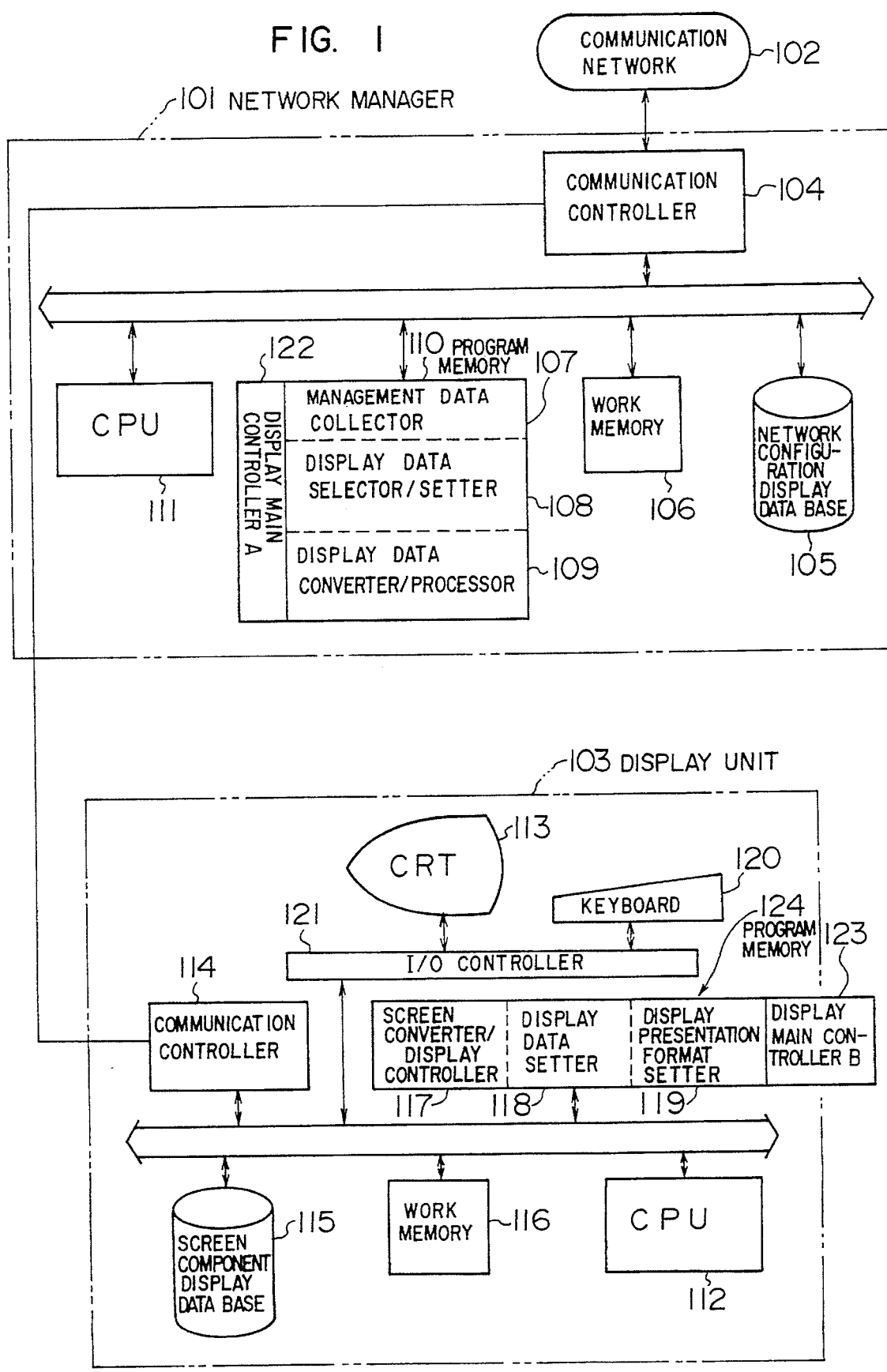
FIG. 1 is a network management/display processing system in accordance with a first embodiment of the present invention.

Referring first to FIG. 1, there is shown an arrangement of a network management/display processing system in accordance with an embodiment of the present invention.

The illustrated system includes a communication network 102 to be managed, a network manager 101 and a display unt 103. The network manager 101 comprises a communication controller 104 for collecting management data on the communication network 102 to be managed and also for performing communication of display data with the display unit 103, a data base 105 for storing therein the management data and the display data, a work memory 106 for retrieving necessary data from the data base 105 and temporarily storing therein the retrieved data or a conversion result to the display data, a program memory 110, and a central processing unit (CPU) 111. In more detail, the program memory 110 stores a management data collecting program 107 for controlling the collection of the management data from the communication network 102, a display data selecting/setting program 108 for selecting and setting the display data to be transmitted to the display unit 103, a display data converting program 109 for converting the selected display data and a main program 122 of these subroutine programs for a displaying maid controller A. The CPU 11 controls access to these programs, the memory and the data base.

Meanwhile, the display unit 103 comprises a communication controller 114 for controlling communication of the display data with the network manager 101, a data base 115 for storing the display data and screen data, a work memory 116 for temporarily storing the display data or storing a conversion result to the screen data, a program memory 122, a CRT 113 for displaying the display data, an input means such as a keyboard 120 for entering various sorts of parameters therethrough, and a CPU 112. In more detail, the program memory 122 has a screen conversion/display control program 117 for converting the display data into the screen data and controlling the display screen, a display-data setting program 118 for setting the display data in the data base 105 of the network manager 101 through the communication controller 114, a display-presentation-system setting program 119 for assigning the conversion system of the display data to the screen data, an I/O control program 121 for controlling input/output to the input/output unit, and a main program 123 of these subroutine programs for a display main controller B. The CPU 112 controls the access to these input/output means, the memory and the data base.

Explanation will next be made as to the arrangements and operations of the respective parts of the above embodiment in accordance with a network management/display method of an embodiment of the present invention.

Figure 2:
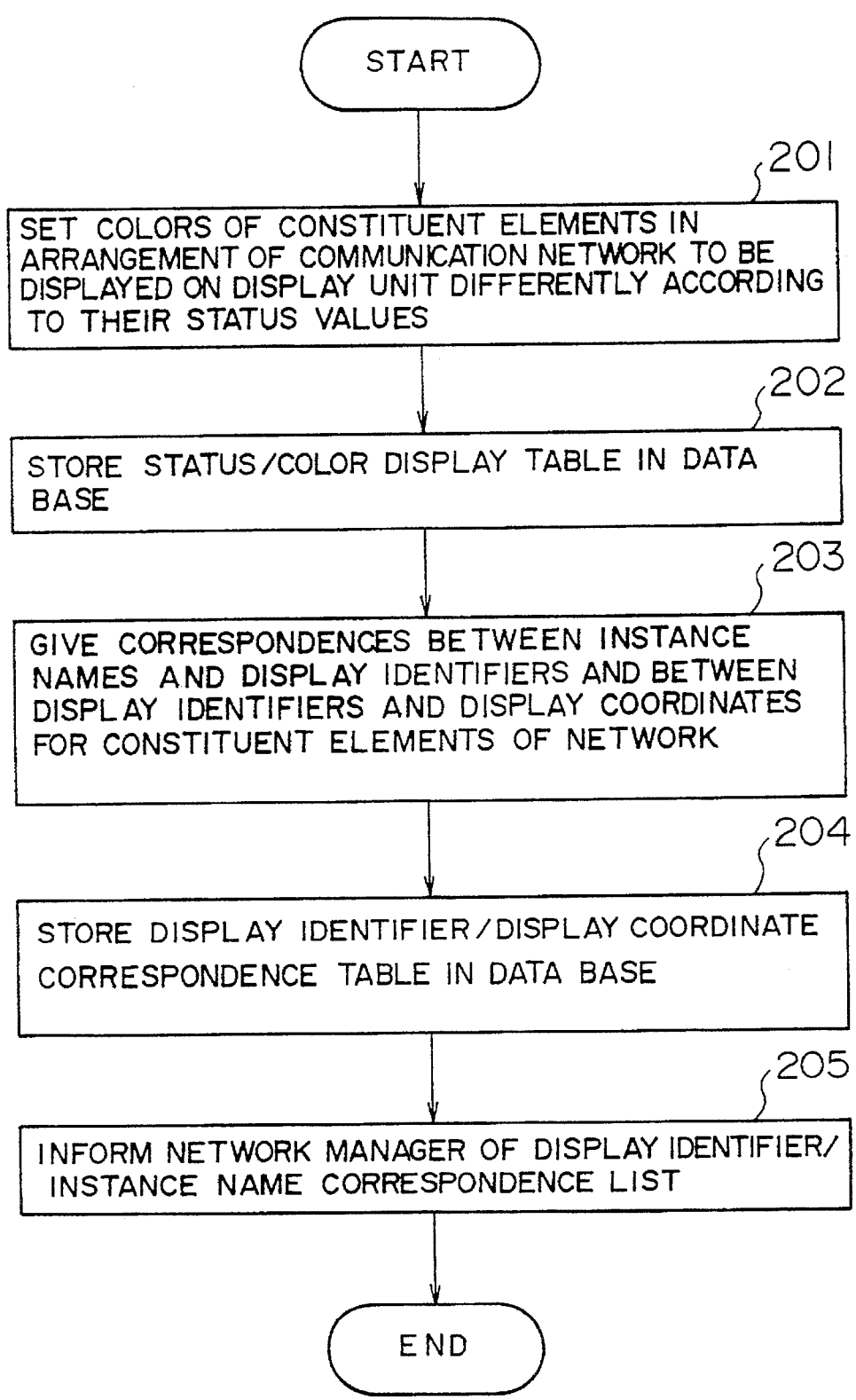
FIG. 2 is a flowchart for explaining the operation of a display unit 103 prior to operation of the network management/display processing system of FIG. 1.

Shown in FIG. 2 is a flowchart for explaining the operation of the display unit 103 under control of display main controller B prior to the operation of the network management/display processing system. First, prior to the operation of the network management/display processing system, a user at the display unit 103 sets colors of elements in the communication network to be displayed on the CRT 113 according to their status values (administrative state value, operational state value and severity) as shown in a state display color matrix table in FIG. 3, using the keyboard 120 and the display-presentation-system setter 119 (step 201) to store the set data in the screen configuration/display data base 115 (step 202).

Figure 16:
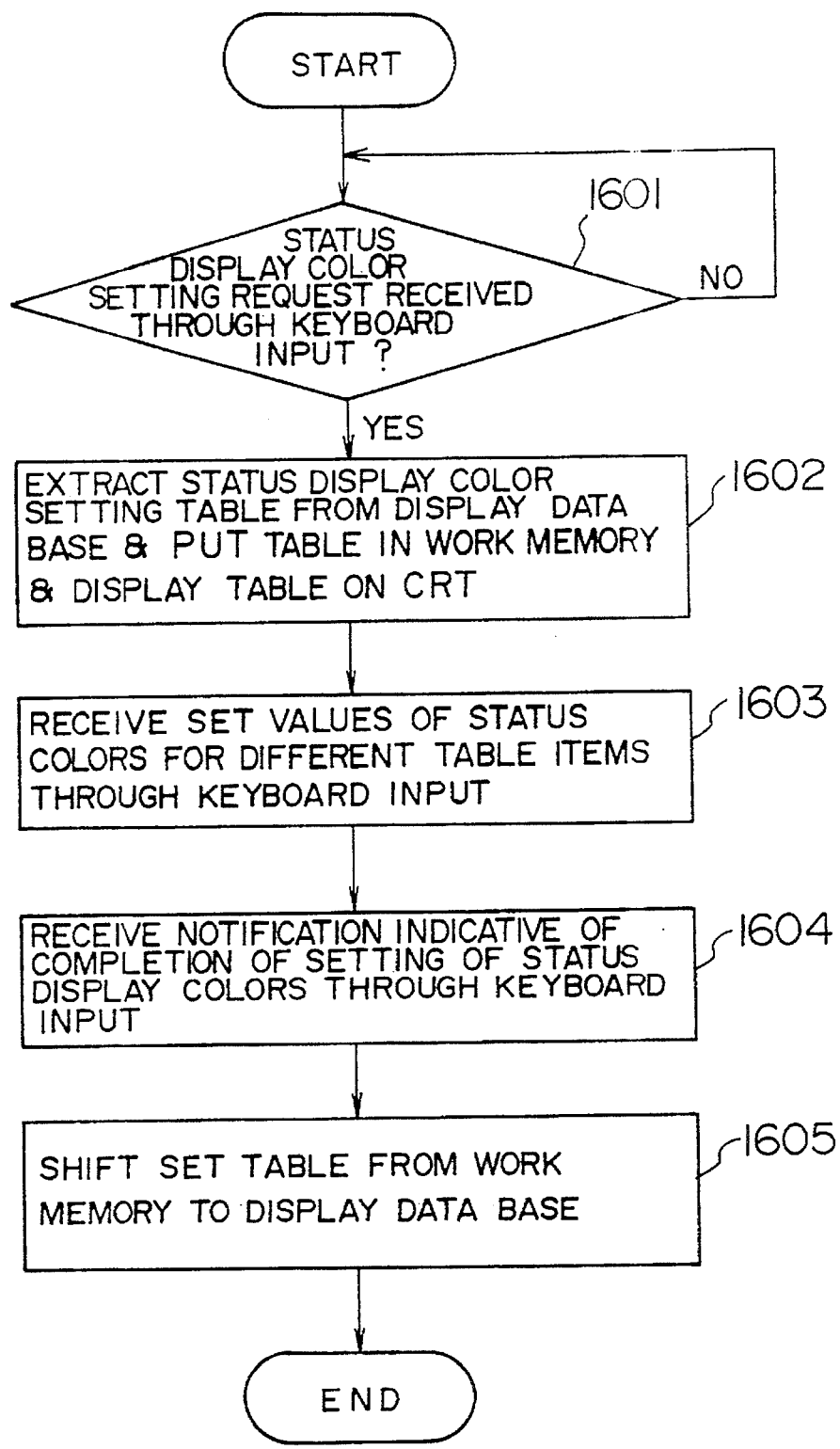
FIG. 16 is a flowchart for explaining the operation of a display presentation format setter 119.

The operation of the display presentation format setter 119 is shown by a flowchart in FIG. 16. More specifically, the presentation format setter 119, when receiving a status display color setting request from the input of the keyboard 120 (step 1601), extracts the status display color setting table from the display data base 115 and puts the table in the work memory 116 to display the table on the CRT 113 (step 1602). Next, the display presentation format setter 119 receives set values of status colors for different table items from the keyboard 120 (step 1603). Finally, the setter 119 receives a notification indicative of completion of the setting of status display colors from the keyboard 120 (step 1604), whereby the set table is shifted from the work memory 116 to the screen/display data base to be stored therein (step 1605), at which stage the setter 119 completes its processing operation.

Turning again to FIG. 2, the display unit 103 performs, through the display data setter 118, correspondences between instances (address names indicative of where the object to be managed belongs in the communication network) of the elements of the communication network to be displayed on the CRT 113 and display identifiers as well as correspondences between the display identifiers and the screen component data (display coordinates on the screen) (step 203) to prepare a list showing the correspondences between the display identifiers and the instances as shown in FIG. 5 as well as a table showing the correspondences between the display identifiers and the screen display coordinates as shown in FIG. 4, stores the correspondence table of FIG. 4 in the data base 115 (step 204) and transmit the correspondence list of FIG. 5 to the network manager 101 (step 205).

Figure 17:
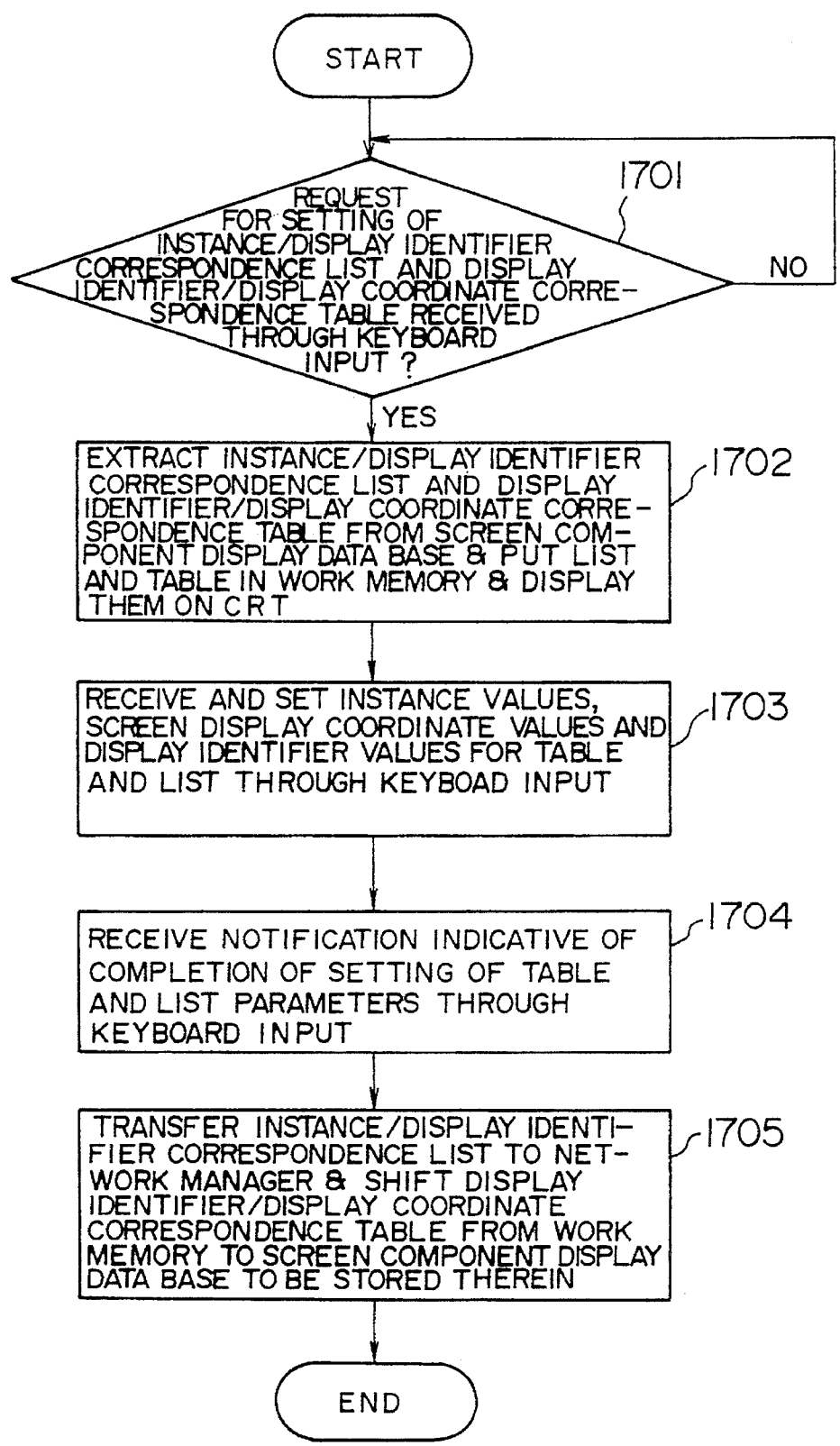
FIG. 17 is a flowchart for explaining the operation of a display data setter 118.

The operation of the display data setter 118 is shown by a flowchart in FIG. 17. More specifically, the display data setter 118, when receiving a user's request via keyboard 120 for setting the instance/display identifier correspondence list and the display identifier/display coordinate correspondence table (step 1701), extracts the table and list from the data base 115, puts them in the work memory 116, and displays them on the CRT 113 (step 1702). Next, the display data setter 118 receives instance values, screen display coordinate values and display identifier values for the table and list from the user via keyboard 120 and sets the input values in the table and list (step 1703). Finally, the display data setter 118, when receiving a notification indicative of completion of the setting of the table and list parameters from the user via keyboard 120 (step 1704), transfers the display identifier/display coordiante correspondence table from the work memory 116 to the data base 115, and transmits the instance/ display identifier correspondence list to the network manager 101 (step 1705).

Figures 6, 7:
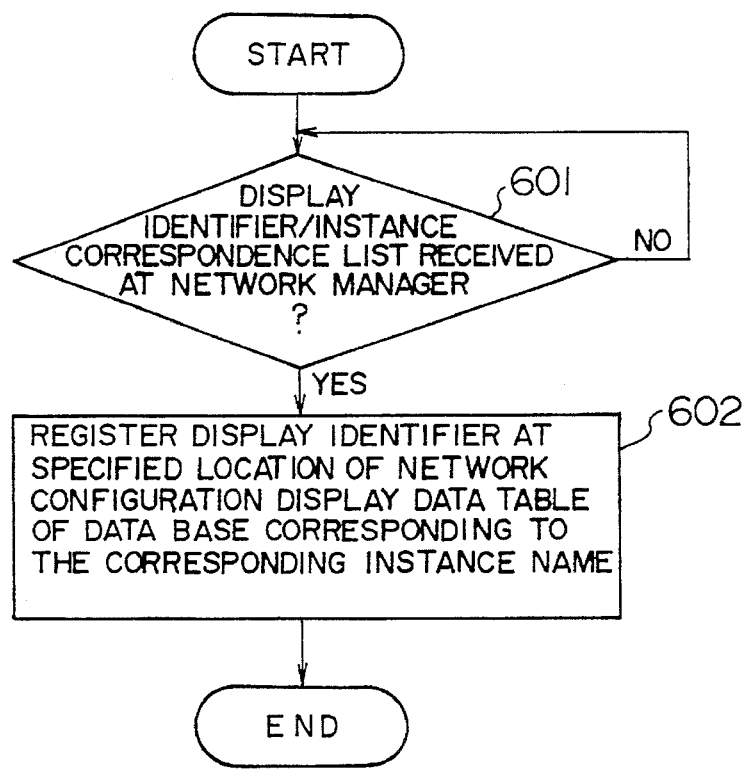
FIG. 6 is a flowchart for explaining the operation of a network manage prior to the operation of the network management/display processing system of FIG. 1.
FIG. 7 is a network configuration/display data table for use in the embodiment.

FIG. 6 is a flowchart for explaining the operation of the network manager under control of the display main control program A prior to the operation of the network management processing system of FIG. 1. The network manager 101, when receiving the above display identifier/instance correspondnece list (refer to FIG. 5) from the display unit 103 (step 601), stores in a data field of the management object having the corresponding key instance name of such a network configuration/display data table as shown in FIG. 7, through the display data selector/setter 108, a display identifier corresponding to the instance (step 602).

Figure 18:
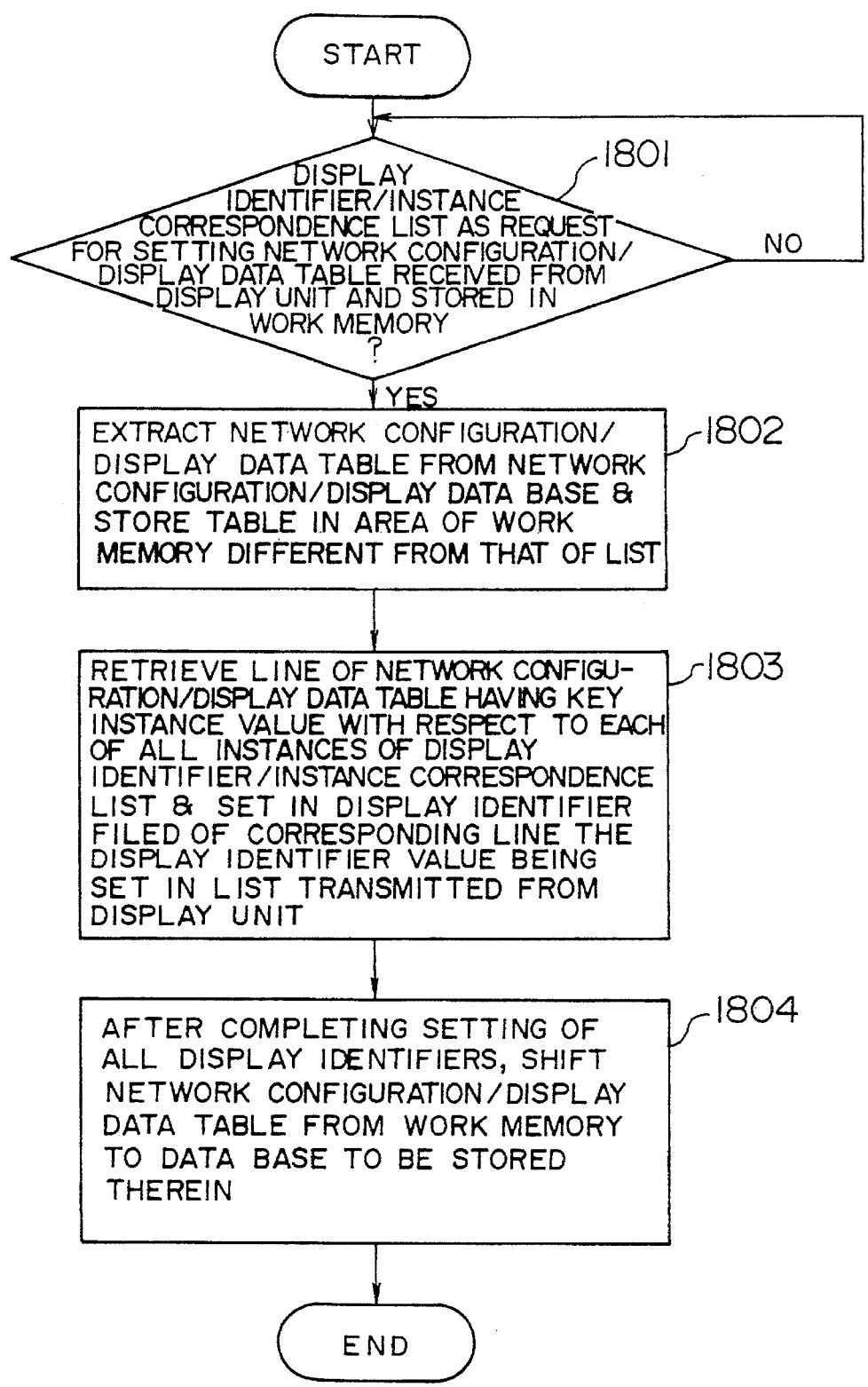
FIG. 18 is a flowchart for explaining the operation of a display data selector/setter 108.

The operation of the display data selector/setter 108 is shown by a flowchart in FIG. 18. More specifically, the display data selector/setter 108 receives the display identifier/instance correspondence list from the display unit 101 as a request for setting the network configuration/display data table and stores the list in the work memory 106 (step 1801). Next, the display data selector/setter 108 extracts the network configuration/display data table from the network configuration/display data base 105 and stores the extracted table in an area of the work memory 106 different from that of the list (step 1802). The selector/setter 108 then retrieves a line of the network configuration/display data table having the key instance value with respect to each of the instances of the display identifier/instance correspondence list, and sets in the display identifier field of the corresponding line the display identifier value set in the list transmitted from the display unit 101 (step 1803). Finally, the display data selector/setter 108, after completing the setting of the all display identifiers, transfer the network configuration/display data table from the work memory 106 to the data base 105 (step 1804).

Figure 8:
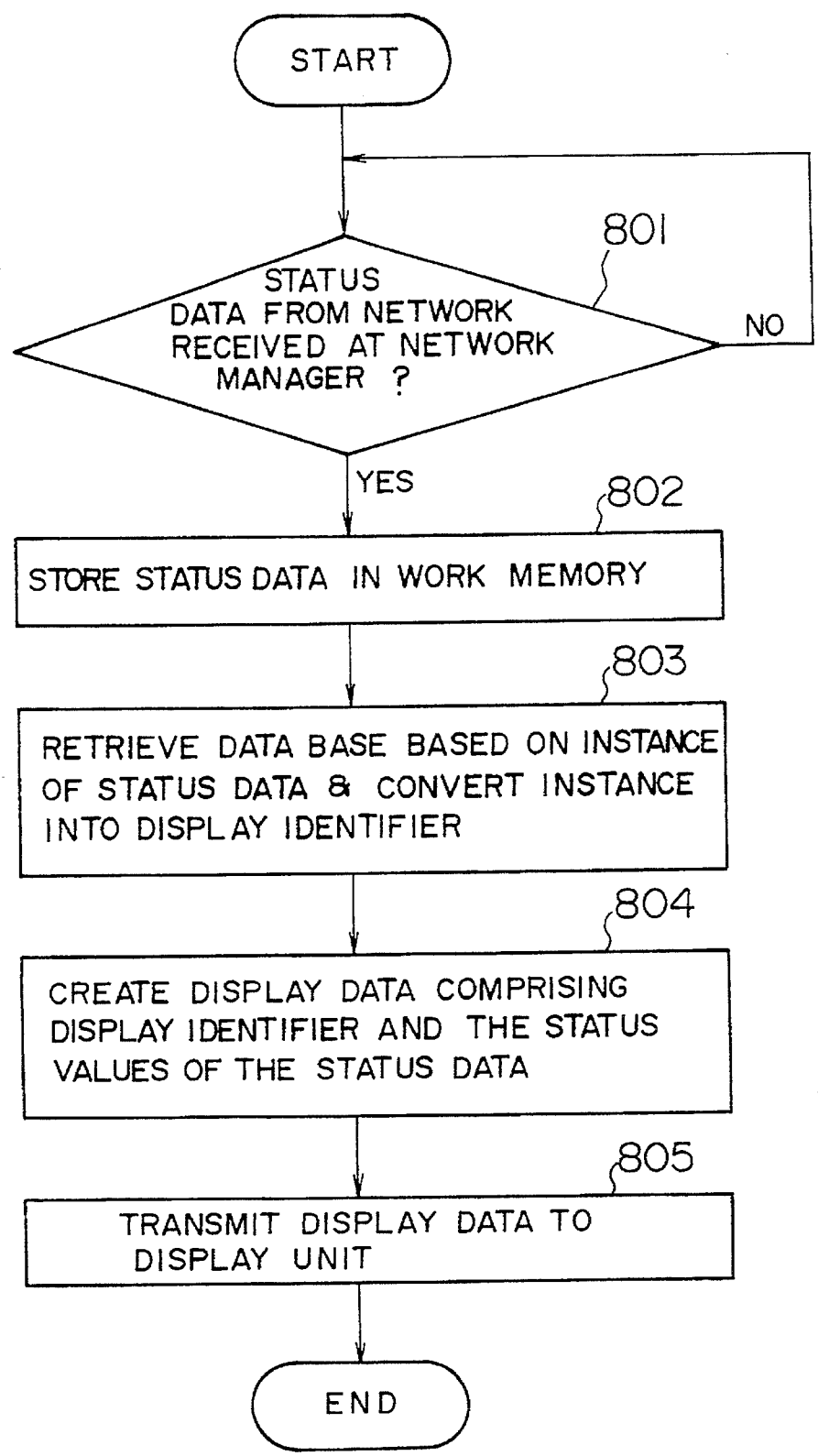
FIG. 8 is a flowchart for explaining the operation of the network manager prior to the operation of the network management/display processing system of FIG. 1.

FIG. 8 is a flowchart for explaining the operation of the network manager 101 (which is executed under control of the display main control program A) during the operation of the network management/display processing system of FIG. 1.

During the operation of the system, the network manager 101 receives management data such as status data (for example, instance=packet network, packet exchange No. 01; administrative state value=01; operational state value=10; severity=3) an autonomous reporting by network elements or under control of the management data collector 107 through the communication controller 104 from the communication network 102 (step 801), and stores the received management data in the work memory 106 (step 802).

Figure 19:
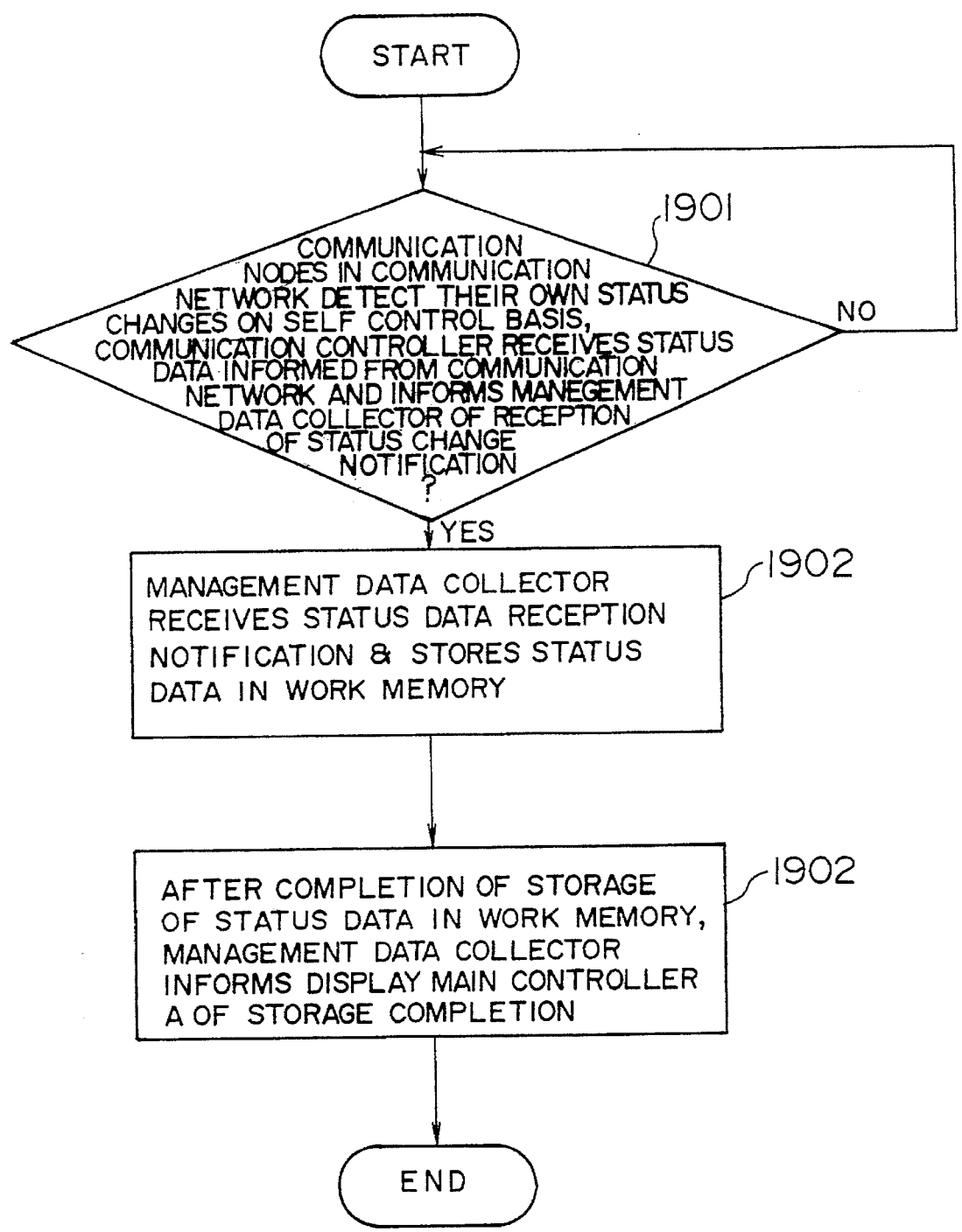
FIG. 19 is a flowchart for explaining the first state of a management data collector 107.

The first-time collecting operation of the management data collector 107 is shown by a flowchart in FIG. 19. More specifically, respective communication nodes in the communication network 102 detect their own status changes. The communication controller 104 receives the status data from the communication network 102 and informs the management data collector 107 of the reception of the status change notification (step 1901). The management data collector 107 then stores the received status data in the work memory 106 (step 1902) and finally informs the display main controller A of the storage completion (step 1903).

Returning again to FIG. 8, the display data converter/processor 109 next retrieves the network configuration/display data table based on the key instance contained in the status data and converts the instance to a display identifier (01) (step 803). This causes the display data converter/processor 109 to create a display data (in the above example, display identifier =01; administrative state value=01; operational state value=10; severity=3) comprising the display identifier and the status value (step 804) and to send the created display data through the communication controller 104 to the display unit 103 (step 805).

Figure 20:
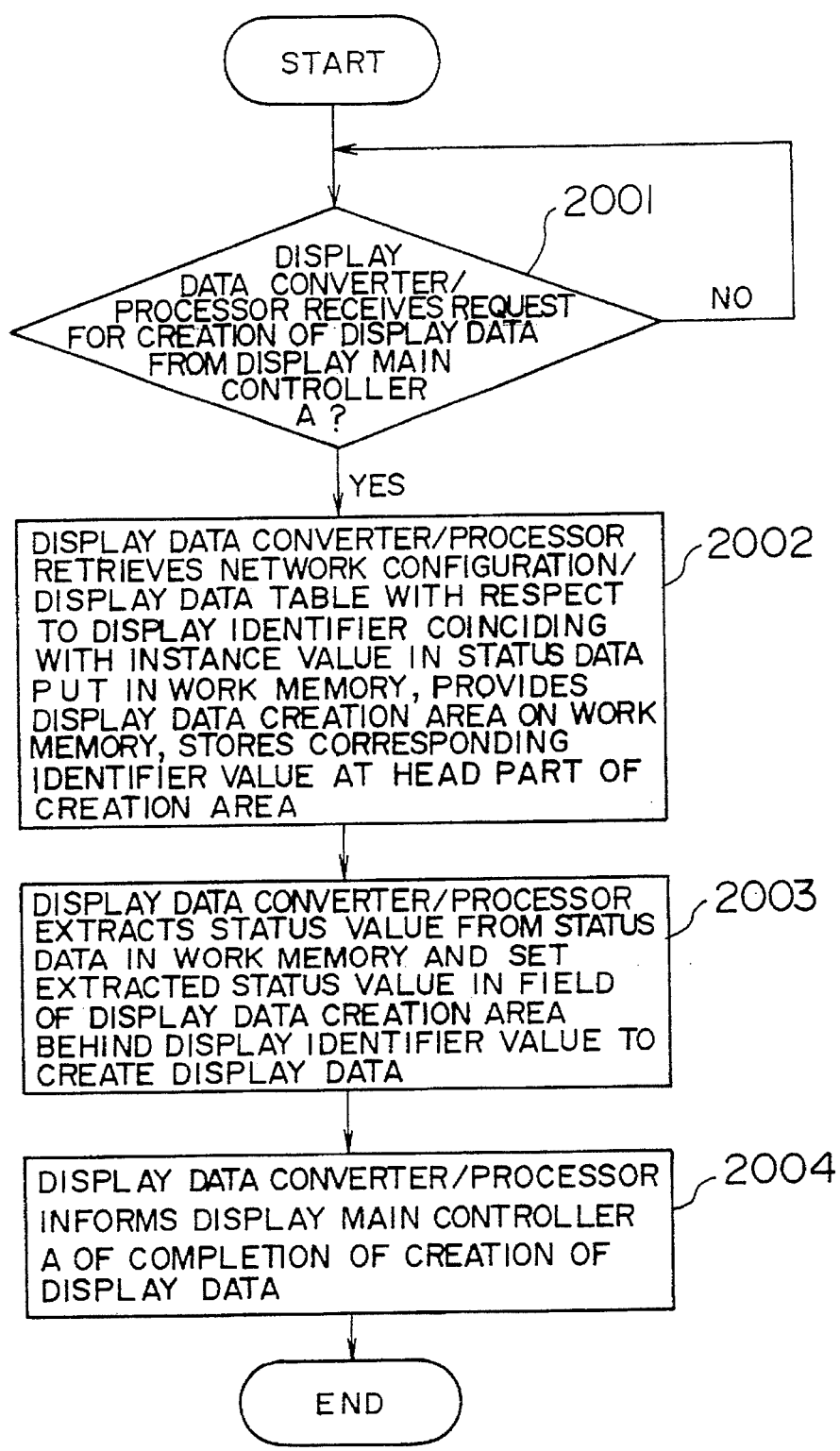
FIG. 20 is a flowchart for explaining the operation of a display data converter/processor 109.

The operation of the display data converter/processor 109 is shown by a flowchart in FIG. 20. More specifically, the display data converter/processor 109, when first receiving a request for creation of a display data from the display main controller A (step 2001), retrieves the network configuration/display data table associated with a display identifier coinciding with the instance value in the status data placed in the work memory 106, provides a display data creation area on the work memory 106, and stores the corresponding identifier value at the head part of the creation area (step 2002). The display data converter/processor 109 then extracts the status value and sets the extracted status value in a field of the display data creation area behind the display identifier value to create a display data (step 2003). Then the display data converter/processor 109 informs the display main controller A of completion of the creation of the display data (step 2004).

Figure 9:
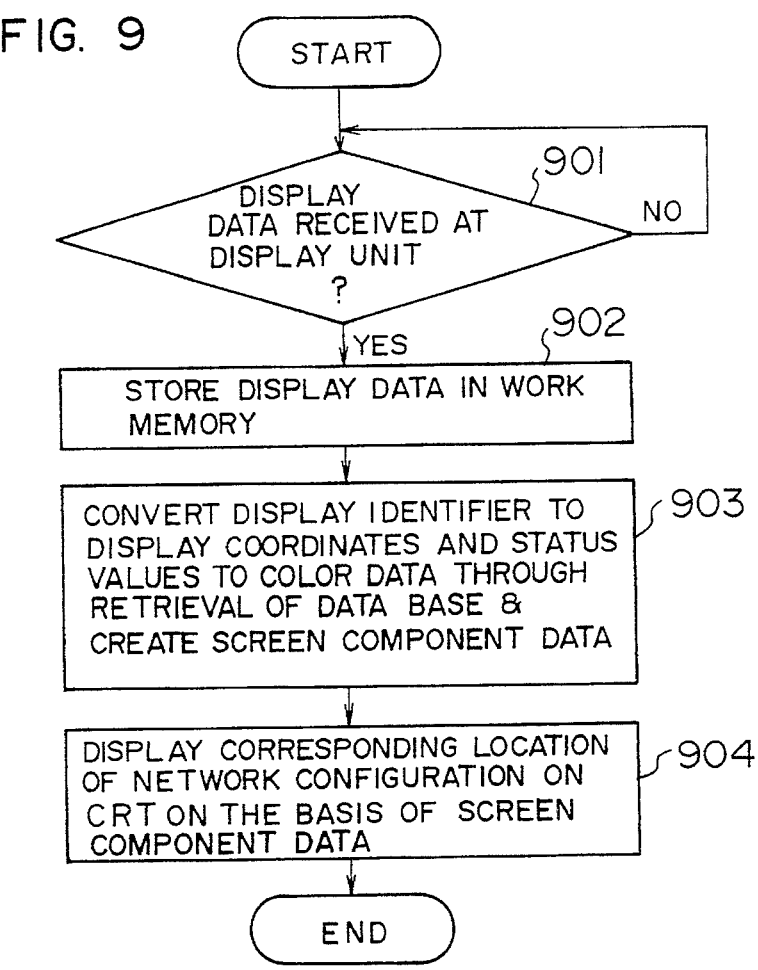
FIG. 9 is a flowchart for explaining the operation of the display unit during the operation of the network management/display processing system of FIG. 1.

Shown in FIG. 9 is a flowchart for explaining the operation of the display unit 103 during the operation of the network management/display processing system of FIG. 1.

Figure 10:
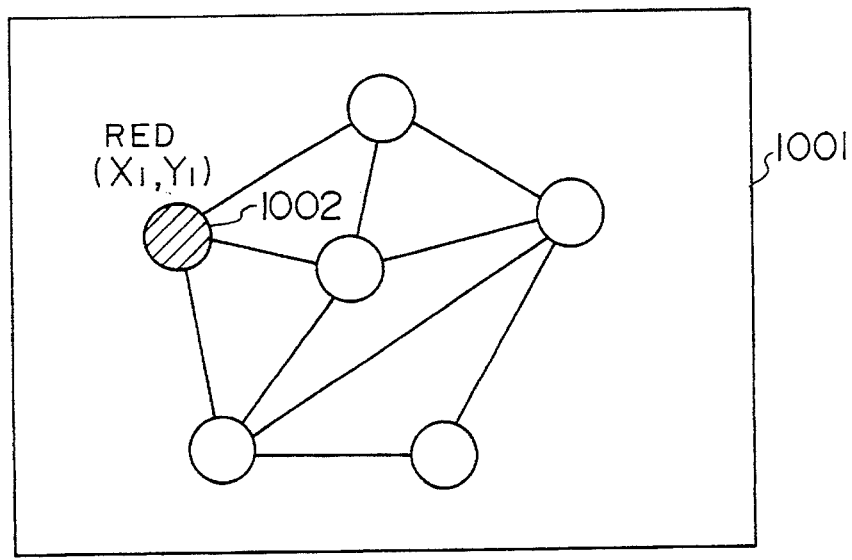
FIG. 10 is a communication network configuration displayed on a display screen.

In more detail, the display unit 103 temporarily stores the received display data in the work memory 116 (steps 901 and 902). Next, the screen converter/display controller 117 retrieves the display identifier/display coordinate correspondence table and the status color/display matrix table of the data base 115 based on the display identifier (01) and the status values (administrative state value=01; operational state value= 10; severity=3), and converts the display identifier and status values into a screen component data comprising a display coordinate $(X_1, Y_1)$ and a color data (red) corresponding to the status values on the network configuration screen (step 903). Based on the screen component data (screen display coordinate=$X_1, Y_1$; color=red), the I/O controller 121 displays a corresponding location $(X_1, Y_1)$ 1002 of a communication network configuration screen 1001 in the specified color (red) on the CRT 113, as shown in FIG. 10 (step 904).

Figure 21:
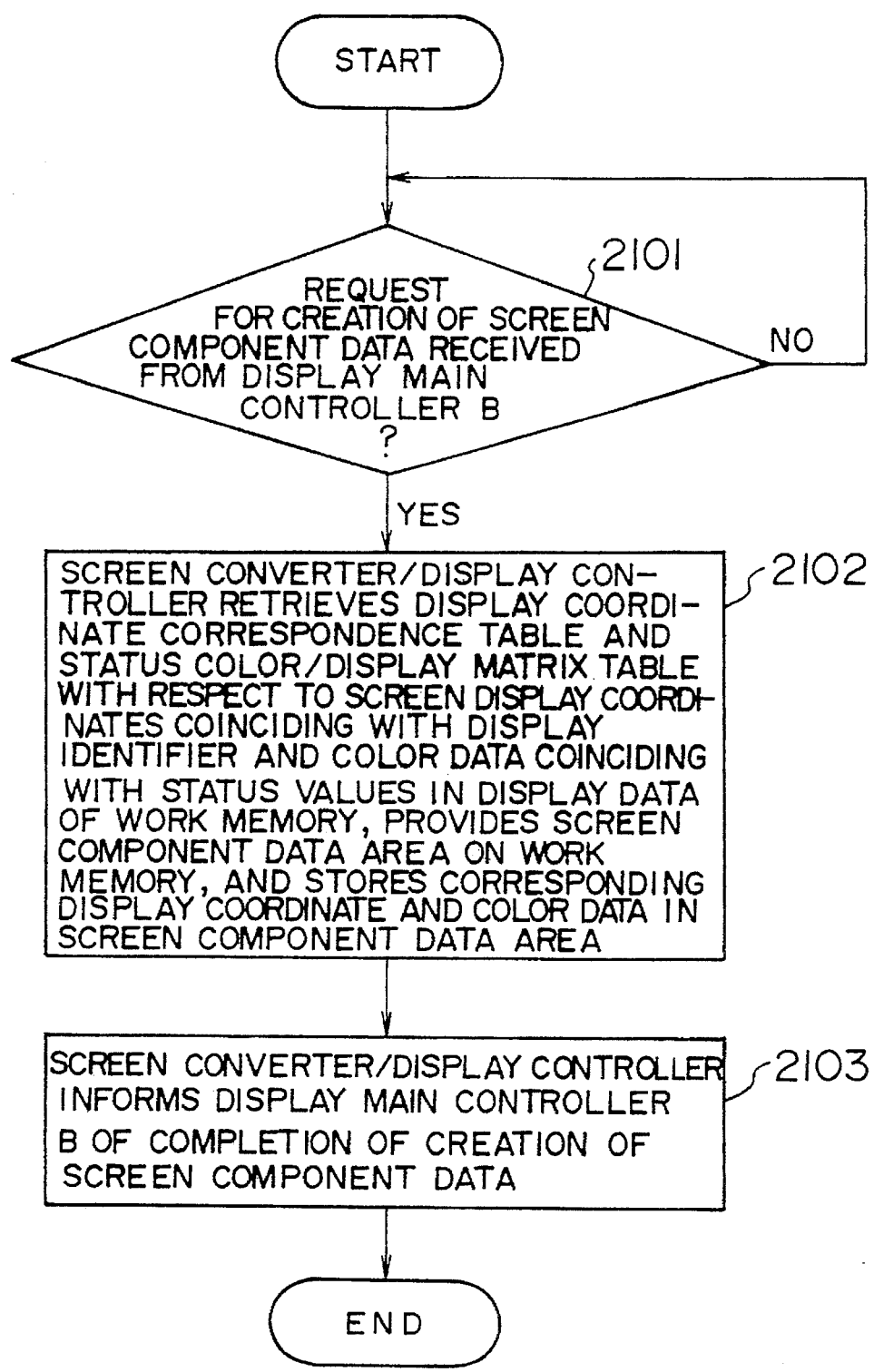
FIG. 21 is a flowchart for explaining the operation of a screen converter/display controller 117.

The operation of the screen converter/display controller 117 is shown by a flowchart in FIG. 21. More specifically, the screen converter/display controller 117, when receiving a request for creation of a screen component data from the display main controller B (step 2101), first retrieves the display coordinate correspondence table and the status color/display matrix table associated with the screen display coordinates coinciding with the display identifier and the color data coinciding with the status values in the display data of the work memory 116, provides a screen component data area on the work memory 116, and stores the corresponding display coordinate and color data in the screen component data area (step 2102). Finally the screen converter/display controller 117 informs the display main controller B of completion of the creation of the screen component data (Step 2103).

Figure 22:
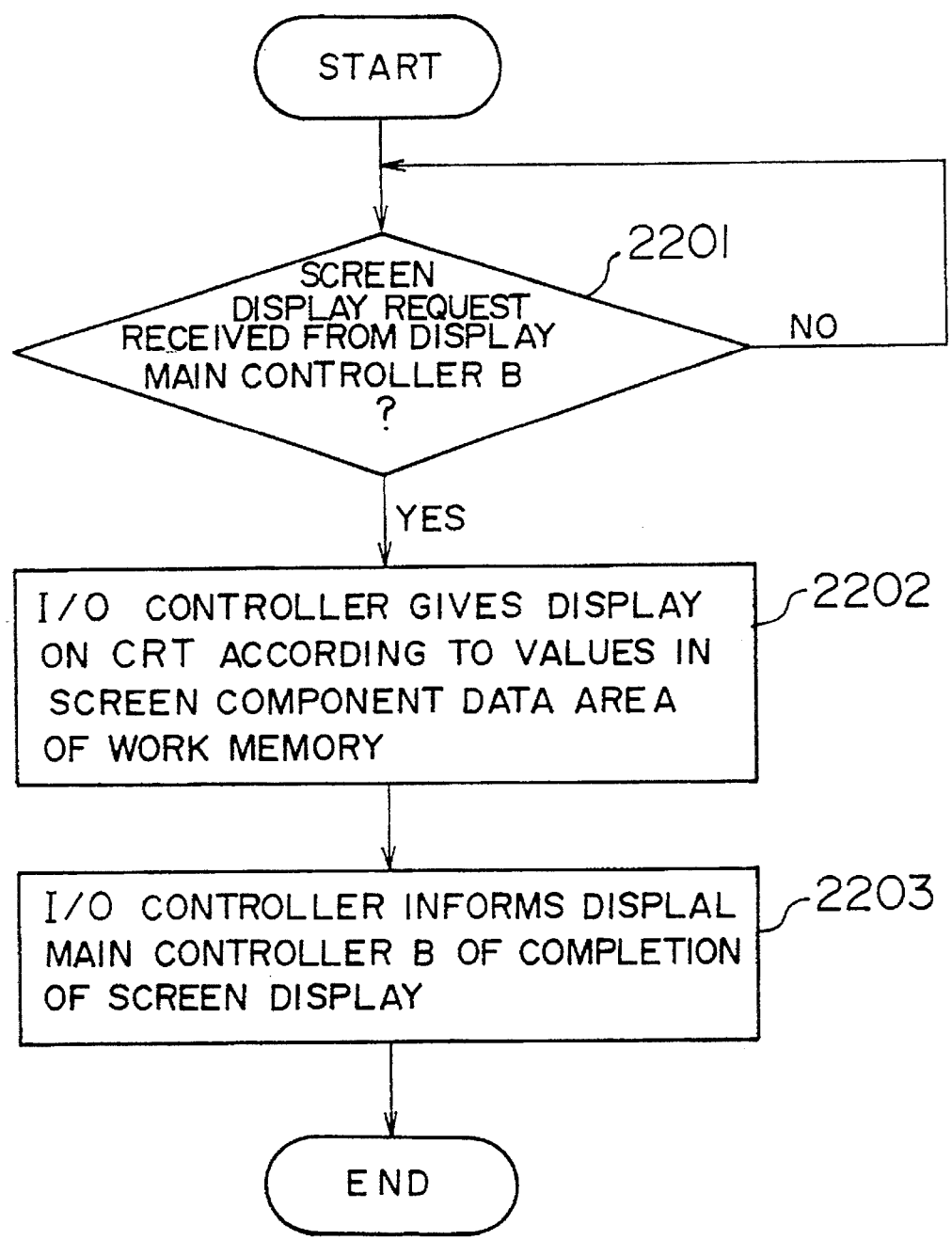
FIG. 22 is a flowchart for explaining the operation of an I/O controller 121.

The operation of the I/O controller 121 is shown by a flowchart in FIG. 22. More specifically, the I/O controller 121, when receiving a screen display request from the display main controller B (step 2201), first indicates a display on the CRT 113 according to the values in the screen component data area of the work memory 116 (step 2202). Finally, the I/O controller 121 informs the display main controller B of completion of the screen display (step 2203).

With such arrangement and operation as mentioned above, the creation of the display data is carried out by the network manager and to lightens the display processing load of the display unit, and the display identifier is used to perform communication with short data. Whereby the communication quantity between the network manager and the display unit can be reduced and the display unit can easily identify the corresponding component element on the communication network screen using the display identifier. Further, since the user can assign his or her desired color corresponding to the status values, a highly effective human interface is realized.

EMBODIMENT (2)

Explanation will be made as to a second embodiment of the present invention, wherein a display unit can display management data of an object having complicated expression to be managed, but not contained as a display object (having no such display identifier as mentioned above), in association with a management object contained as a display object.

Figure 12:
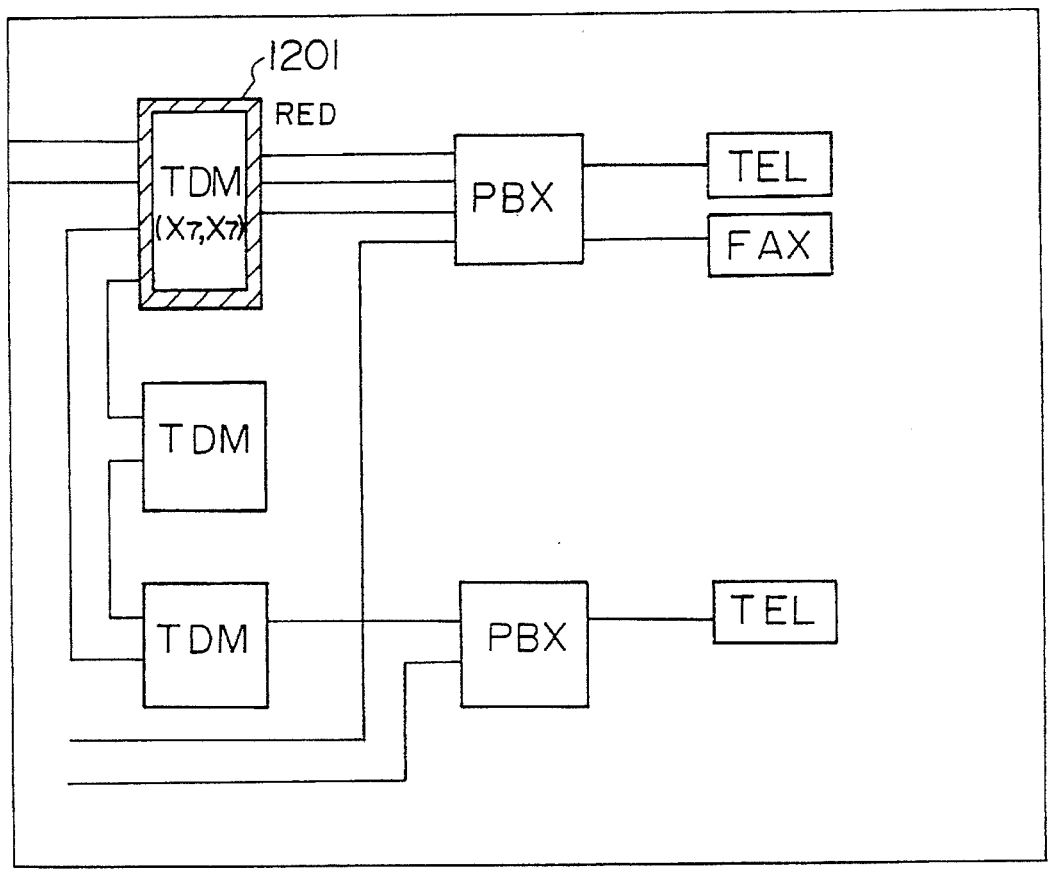
FIG. 12 is a communication network configuration displayed on a display screen (2)

The present embodiment is substantially the same in system arrangement and operation as the Embodiment (1), except that the network configuration/display data table stored in the data base 105 of the network manager 101 contains a containment pointer which indicates another management object superior in the containment relationship of the communication network configuration than the related management object (instance) as shown in FIG. 11. More specifically, in the case where the display data converter/processor 109 retrieves a display identifier based on the instance of the status data received from the communication network 102 during the operation of the network management/display processing system, if the display data converter/processor 109 fails to find a display identifier corresponding to the instance, i.e., if the instance has no such display identifier as to indicate a direct display object to the display unit, then the display data converter/processor 109 finds management data of the management object contained as the direct display object to the display unit 103 which is superior in the containment (hierarchical) relationship than the management object having the detailed level or complicated expression but not contained as the direct display object in the communication network configuration, and transmits both the original and newly found management data from the network manager 101 to the display unit 103. The display unit 103 in turn displays information of non-display objects as associated with the display object. For example, there is no such display identifier for a 28th management object of FIG. 11 "having a high-speed digital network, a multiplexer No. 07 and a communication module as an instance". In this case, its display identifier is set to be NULL (no object), a 7th management object of the display object "having a high-speed digital network and a multiplexer No. 07 as an instance" and superior in the containment relationship than the 28th management object is found based on a containment pointer 1101, a display data A for the 28th management object "having a high-speed digital network, a multiplexer No. 07 and a communication module as an instance" is set to have display identifier=NULL, administrative state value=01, operational state value=10 and severity=3, and a display data B for the 7th management object "having a high-speed digital network and a multiplexer No. 07 as an instance" is set to have display identifier=07, administrative state value=CONT, operational state value=CONT, severity=CONT and status value=CONT (indicating the upper containment relationship). A pair of two sorts of such display data A and B are transmitted from the net manager 101 through the communication controller 104 to the display unit 103. The screen converter/display controller 117 of the display unit 103 obtains screen display coordinates $(X_7, Y_7)$ of the management object which are higher than the display identifier of the display data B and a display color (red) based on the status value of the display data A. Further, since the NULL and CONT data mean the partial trouble of the management object as the display object, the screen converter/display controller 117 creates a screen component data (screen display coordinates= $X_7, Y_7$, color=red, color representation= framing), so that a communication network display screen such as shown in FIG. 12 is provided on the CRT 113, that is, only the corresponding constituent element is distinguishably displayed in a framed color representation 1201.

With the arrangement and operation as mentioned above, the display unit can also show the status of a management object in a detail level as not contained in the display objects on the network configuration display screen with use of the display identifier of the management object contained in the upper display object.

EMBODIMENT (3)

Explanation will be made as to a third embodiment of the present invention wherein a plurality of display units having different application purposes are all connected to a common network manager.

Figure 13:
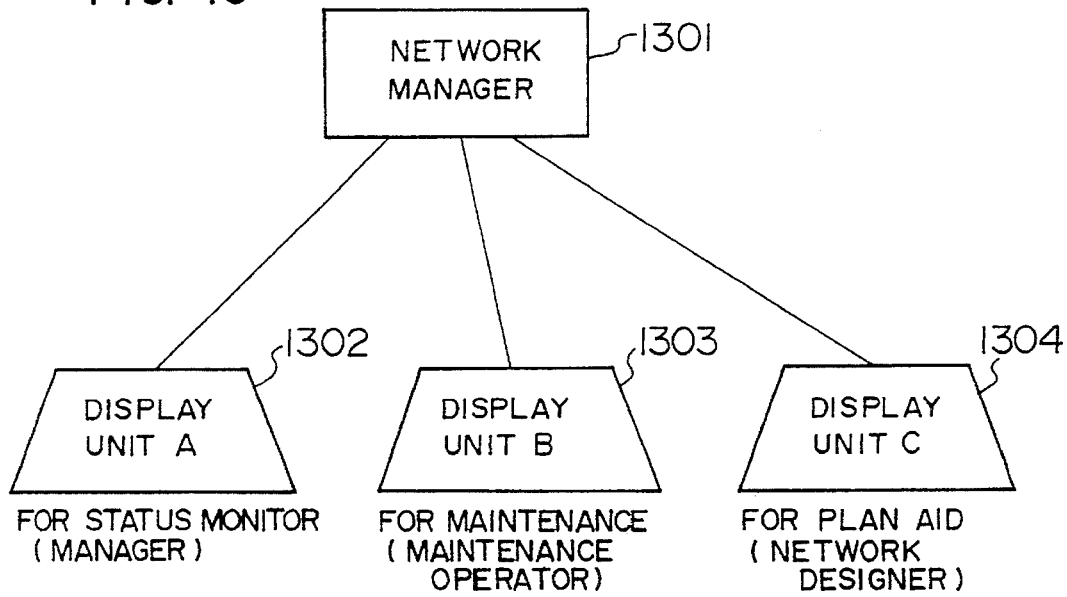
FIG. 13 is an arrangement of a network management/display processing system comprising a plurality of display units.

FIG. 13 shows an arrangement of a network management/display processing system in accordance with the third embodiment of the present invention. As illustrated, a common network manager 1301 is connected to three display units A, B and C having different application purposes, that is, a display unit 1302 for manager, a display unit 1303 for maintenance operator and a display unit 1304 for network designer. The interior structure of each of the display units 1302, 1303 and 1304 are substantially the same as that of the display unit 103 in FIG. 1. Meanwhile, the interior structure of the network manager 1301 is also substantially the same as that of the network manager 101 in FIG. 1, except that the display data selector/setter 108 in FIG. 1 contains a program for specifying one of the display units to be transmitted by means of a data sort identifier included in the management data collected from the communication network 102, and the data base 105 contains a table showing such transmission destinations (distribution destinations).

Figures 14, 15:
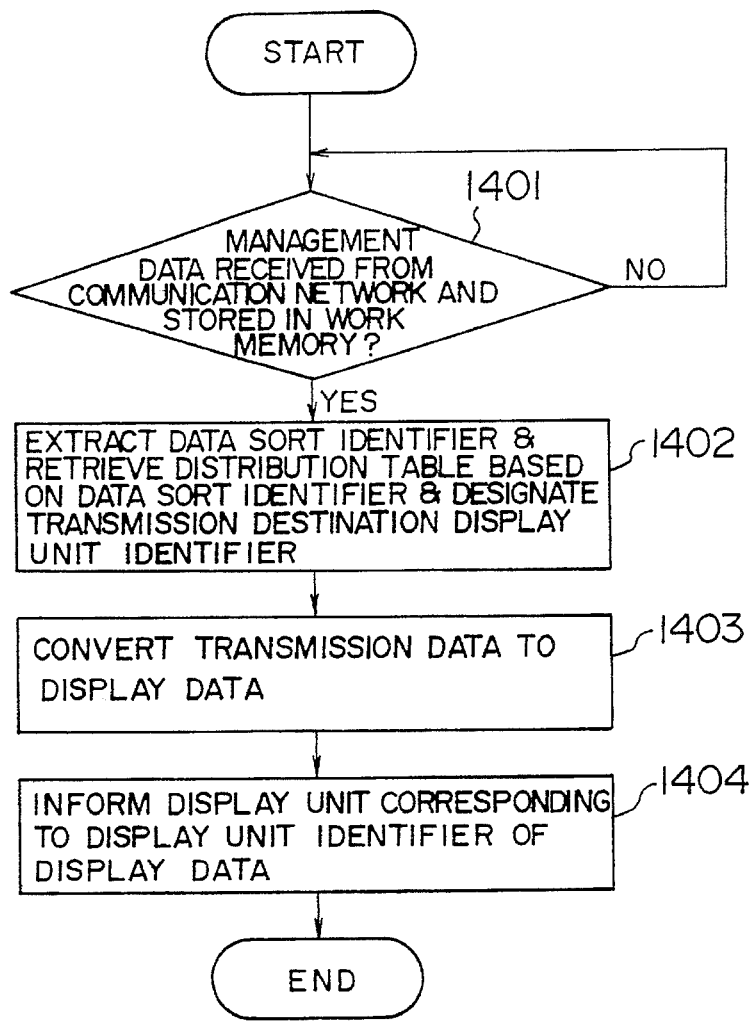
FIG. 14 is a flowchart for explaining the operation of a network manager with respect to the plurality of display units.
FIG. 15 shows a distribution destination table.

FIG. 14 is a flowchart for explaining the distributing operation of the network manager 1301 of the present embodiment with respect to the display data to the plurality of display units 1302, 1303 and 1304 under control of the display main controller A. FIG. 15 shows the aforementioned transmission destination table.

First, the network manager 1301, when receiving management data from the communication network 102, temporarily stores the received management data in the work memory 106 via the communication controller 104 (step 1401). The network manager 1301 extracts a data sort identifier from the received message and designates a transmission destination display unit identifier by referring to the distribution table (refer to FIG. 15) of the network configuration/display data base 105 at the display data selector/setter 108 (step 1402).

Figure 23:
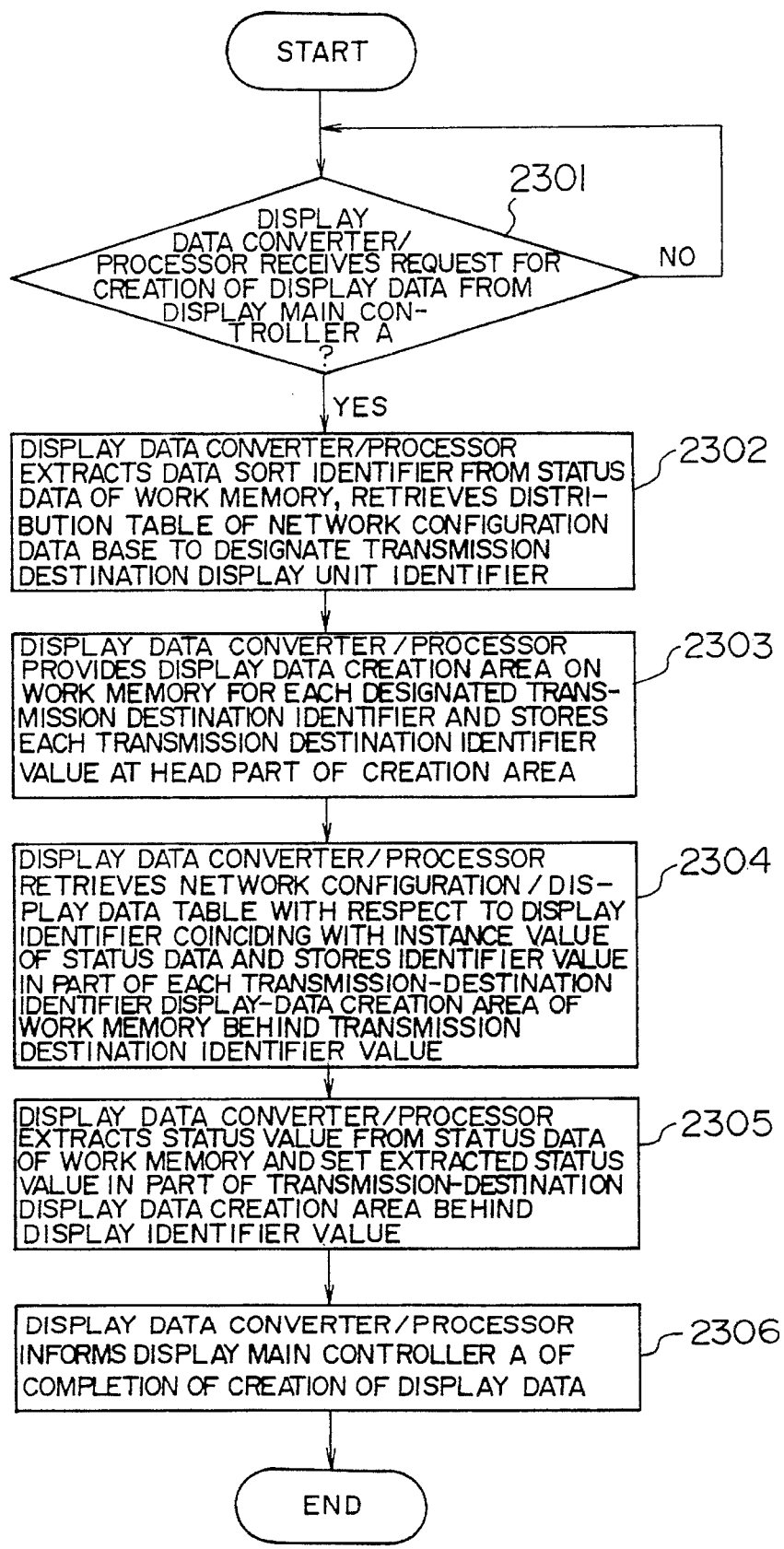
FIG. 23 is a flowchart for explaining the operation of the display data selector/setter 108 used in Embodiment (3).

The operation of the display data selector/setter 108 is shown by a flowchart in FIG. 23. More specifically, the display data selector/setter 108, when receiving a request for creation of a display data from the display main controller A (step 2301), extracts the data sort identifier from the status data of the work memory 106, and retrieves the distribution table of the network configuration data base 105 to designate a transmission destination display unit identifier (step 2302). The display data converter/processor 109 provides a display data creation area on the work memory 106 for each designated transmission destination identifier and stores each transmission destination identifier value at the head part of the creation area (step 2303). Then, the display data converter/processor 109 retrieves the network configuration/display data table with respect to a display identifier coinciding with the instance value of the status data and stores the identifier value in each transmission-destination identifier display-data creation area of the work memory 106 behind the transmission destination identifier value (step 2304). The display data conveter/processor 109 extracts the status value from the status data of the work memory 106 and sets the extracted status value in the transmission-destination display data creation area behind the display identifier value (step 2305). Finally, the display data converter/processor 109 informs the display main controller A of completion of the creation of the display data (step 2306).

Turning again to FIG. 15, data sort identifiers 1, 2 and 3 identify status data, trouble data and performance data respectively. When the data sort identifier 1, the transmission destination display unit identifiers are 1 and 2, the display data is transmitted to the display units 1302 and 1303. When the data sort identifier 2, the transmission destination display unit identifiers are 1, 2 and 3, the display data is transmitted to the display units 1302, 1303 and 1304. When data sort identifier 3, the transmission destination display unit identifiers is 3, the display data is transmitted to the display unit 1304.

Returning again to FIG. 14, the display data converter/processor 109, after creating a display data to be transmitted to the display unit or units (step 1403), transmits the created display data to the corresponding display unit destination (step 1404).

With such arrangement and operation as explained in the foregoing, since the previous selection and distribution of the management data at the side of the network manager enable extraction of only the data corresponding to its application purpose, the communication quantity between the network manager and the display units can be reduced and thus, processing burden of the display units can be reduced.

EMBODIMENT (4)

Explanation will be made as to a fourth embodiment of the present invention, wherein color distribution is performed while considering the importance of a management object when viewed from user's viewpoint in addition to the importance of determining color distinction in the status display color matrix table.

The arrangement and operation of the present embodiment is substantially the same as those of the Embodiment (1), except that, when determining the display color of a constituent element in the communication network arrangement according to the status values at the display presentation format setter 119 of the display unit 103, the determination is carried out on the basis of a total importance corresponding to an integration of the severity as a status value and the management object importance when viewed from the user's viewpoint. To this end, in the arrangement, a program for determining a color based on a total importance I expressed by the following evaluation equation is set in the display presentation format setter 119.

$$I=(n_1+n_2)\times 2 \div 3$$

A severity value $n_1$ represents either critical= 6, major=5, minor=4, indeterminate=3, warning= 2 and normal=1; while a user importance $n_2$ represents either high importance level=3, middle importance level=2 and low importance level=1.

In operation, the screen converter/display controller 117 determines, according to the value of I based on the status values (administrative state value, operational state value, severity, user importance), 0–1 is specified in the matrix table of FIG. 3 depending on the management and operational state value, 1–2 for yellow, 2–3 for orange, 3–4 for red, 4–5 for red (blink), 5–6 for red (blink) for color distinction; creates and display a screen component data.

As a result, the user of the network management/display processing system can also reflect the management object importance when viewed from the user on the distinct color representation of the network status advantageously.

In accordance with the present invention, in a management/display processing system of a type wherein a large amount of management data can be processed as in management of a communication network to be displayed on a display unit, since the management data is converted and processed to display data handleable at the display unit, and communication with the display unit can be carried out with use of such an abbreviated short data as a display identifier, the display processing load of the display unit side can be reduced and the communication quantity between the network controller and the display unit can be minimized. Further, by creating and attaching a display data utilizing containment relationship in the arrangement of the communication network, the data of a management object not contained in the display objects can be displayed as associated with the corresponding management object contained in the display objects. In addition, since the display unit is provided with a function of setting a display parameter for color setting in somewhat varying degree depending on user's preference, a highly effective network management human interface can be realized.

What is claimed is:

1. A communication network management system comprising:

a network manager for collecting management information, including operational status, of physical objects in a communication network, each of the physical objects having an instance which is a network node address of the corresponding physical object in said communication network; and display means located remote from said network manager and coupled through a transmission path with said network manager for displaying operational statuses of the physical objects in said communication network on its display screen by displaying graphic representations of said communication network physical objects, wherein said network manager includes, a data table used for converting an instance of a physical object into a corresponding display identifier to be used by said display means when displaying the physical objects operational status, and for storing management information to be displayed, and transmission means for selecting the management information to be displayed on said display means from among the management information stored in said data table, and for transmitting said selected management information to said display means together with the display identifier corresponding to the instance of the physical object for which management information is to be displayed wherein said display means comprises a plurality of display units for displaying different types of management information of physical objects, said network manager has a distribution destination table for storing correspondence between a type of management information and one of said plurality of display units to which the type of management information will be distributed, and said transmission means distributes said selected management information to said plurality of display units using said distribution destination table.

2. A communication network management system as set forth in claim 1, wherein said physical objects have hierarchical levels, said data table further has a pointer indicative of a higher level of the physical object, and said transmission means retrieves management information of the higher level to be displayed using said pointer and said data table, and transmits management information of both higher and lower levels together with the display identifier corresponding to the higher level to one of said plurality of display units using said distribution destination table.

3. A communication network management system as set forth in claim 1, wherein a data length of said display identifier is shorter than that of the corresponding instance.

4. A communication network management system for monitoring on a display screen, operational status of network elements selected as objects of management among a plurality of components of a communication network, the management system comprising:

a network manager for collecting status information of said objects of management from the communication network, each of the status information being associated with one of said objects of management specified by an instance which includes an address name indicative of where the corresponding object belongs in said communication networks;

display terminal with a display screen located remote from said network manager and coupled through a transmission path with said network manager for presenting network configuration on the display screen in which a change in the operational status of each of the objects of management is indicated by changing a display status of a graphic representation representative of the object, wherein said display terminal further includes;

first table means for defining relationships between the instance of each of objects of management to be displayed on the screen and a display identifier assigned to the object;

second table means for defining relationships between coordinate data of each of graphic representation of objects to be displayed on the screen and a display identifier corresponding to the object;

communication control means for informing said network manager of the relationships between the instance and the display identifier defined in said first table means;

wherein said network manager further includes;

data table means for indicating relationships between the instance of each of said objects of management and a display identifier assigned to the instance and informed from said display terminal; and means for transmitting status information of one of said objects collected from said communication network to said display terminal together with the display identifier corresponding to the instance of the object which is specified by referring to said data table means, whereby said display terminal operates to change on the screen a display status of one of the graphic representations specified by the display identifier and in accordance with the status information received from the network manager.

5. A communication network management system as set forth in claim 4, wherein said display means includes display data conversion means for converting object management information to be displayed into a symbol shape having a distinct color.

6. A network management/display processing method in a communication network management system including a network manager for collecting management information, including operational status, of physical objects in a communication network, each of the physical objects having an instance which is a model address of the corresponding physical object in said communication network, and display means located remote from said network manager and coupled through a transmission path to said network manager for displaying operational statuses of the physical objects in said communication network, on a display screen by displaying graphic representations of said communication network physical objects, said method comprising the steps of:

creating, in said display means, a display identifier indicative of physical object management information to be displayed on said display screen;

transmitting relationships between an instance of the physical object management information to be displayed and said display identifier from said display means to said network manager;

creating, in said network manager, a data table for storing the management information of the physical objects which were collected from said communication network along with their associated display identifiers;

selecting, in said network manager, the management information of physical objects to be displayed that have a same display identifier from said data table; and transmitting said selected management information with the display identifier from said network manager to said display means.

7. A network management/display processing method as set forth in claim 6, wherein said physical objects have hierarchical levels, said data table further has a pointer indicative of a higher level of the physical object, and in said transmission step, retrieving a higher level management information to be displayed of the physical object which is not contained in the management information to be displayed using said pointer of said data table, and transmitting management information of both higher and lower level physical objects together with the display identifier corresponding to the higher level physical object to said display means.

8. A network management/display processing method as set forth in claim 6, wherein said display means comprises a plurality of display units for displaying different types of management information, and further comprises the step of:

creating, in said network manager, a distribution destination table for storing correspondence between a type of management information and one of said plurality of display units to which the type management information is distributed, and in said transmission step, distributing said selected management information to said plurality of display units using said distribution destination table.

9. A method as set forth in claim 8, wherein a data length of said display identifier is shorter than that of the corresponding instance.

10. A method as set forth in claim 6, wherein a data length of said display identifier is shorter than that of the corresponding instance.

* * * * *